United States Patent [19]

McCarty

[11] 3,905,742
[45] Sept. 16, 1975

[54] VALVE FOR AN INJECTION MOLDING MACHINE

[75] Inventor: David W. McCarty, Roscoe, Ill.

[73] Assignee: Beloit Corporation, Beloit, Wis.

[22] Filed: Sept. 30, 1974

[21] Appl. No.: 511,022

[52] U.S. Cl. ........ 425/451.2; 425/DIG. 223; 91/189
[51] Int. Cl.[2] ......................................... B29F 1/06
[58] Field of Search ............... 425/451.2, DIG. 223; 91/189, 412

[56] References Cited
UNITED STATES PATENTS

| | | | |
|---|---|---|---|
| 3,084,512 | 4/1963 | Huelskamp | 425/DIG. 223 |
| 3,401,713 | 9/1968 | Olmsted | 91/189 X |
| 3,677,685 | 4/1971 | Aoki | 425/451.2 |
| 3,781,160 | 12/1973 | Mankowsky et al. | 425/DIG. 223 X |

Primary Examiner—Francis S. Husar
Assistant Examiner—David S. Safran
Attorney, Agent, or Firm—Dirk J. Veneman; Bruce L. Samlan; Gerald A. Mathews

[57] ABSTRACT

An injection molding machine having a clamp cylinder, a main ram concentrically disposed within the cylinder to open and close a movable platen. A jack ram is concentrically disposed within the main ram to move the main ram. A prefill valve is concentrically disposed within the cylinder and closely adjacent the jack ram and main ram. A valve stem with a closure member attached thereto is disposed within a prefill valve body. A plurality of orifices in the stem are fluidly connected to a passageway in the stem. During the platen and mold closure, the valve closure member is seated and the orifices in the stem are fluidly connected to a high pressure closing fluid. In accordance with the present invention, the orifices are sized so that the pressure exerted from a spring loaded mold attached to the platens is less than the pressure drop of fluid through the orifices. This prevents the mold and platens from opening until the clamp achieves high pressure buildup.

7 Claims, 4 Drawing Figures

VALVE FOR AN INJECTION MOLDING MACHINE

BACKGROUND OF THE INVENTION

The following relates to injection molding machines and more specifically to prefill valves used therefor. In injection molding machines presently used, prefill valves are utilized within the clamp portion of the injection molding machine. Upon mold closing and during high pressure buildup, the prefill valve is seated and high pressure closing fluid flows through the prefill valve to the main ram volume and through the jack ram to the jack ram volume. When spring loaded molds are secured to the platens, a certain pressure must be maintained in the jack ram volume at all times until high pressure buildup occurs to maintain the mold halves and platens closed. If the pressure is decreased in the jack ram volume, the spring loaded molds may be forced open and the entire molding cycle stopped. This has caused much delay and is one reason why spring loaded molds are not utilized in many injection molding operations. This problem becomes more acute as the mold size increases since the spring forces become even larger. Therefore, it is necessary to maintain even greater pressure in the jack ram volume to overcome the higher spring forces.

It would be desirable then to design an injection molding machine whereby the force in the jack ram area is at least equal to or greater than the force generated by a spring loaded mold to insure that the molds and platens remain closed until the high pressure buildup occurs.

SUMMARY OF THE INVENTION

An injection molding machine including a pair of platens, a clamp cylinder, and a movable main ram disposed within the clamp cylinder. The main ram opens and closes the movable platen. Spring loaded mold halves are attached to the platens. A prefill valve is disposed concentrically within the cylinder and adjacent the main ram. The prefill valve has a valve body and a valve stem slidably disposed within the body. At one end of the stem is a closure member which prevents and allows fluid communication with the main ram. A fluid passage means is in the valve body and is in fluid communication with the main ram. High pressure fluid supply means is fluidly connected to the passage means when the closure is seated to supply high pressure fluid to the main ram. In accordance with the principles of the present invention, the passage means in the prefill valve are sized so that the pressure drop through the passage means is at least equal to or greater than the force exerted by a spring loaded mold when the platens and molds are closed. Therefore, the pressure drop is sufficient to maintain high pressure fluid against the main ram to insure that the molds and platens still closed until high pressure fluid buildup occurs.

DESCRIPTION OF THE PREFERRED EMBODIMENT

Figure 1:
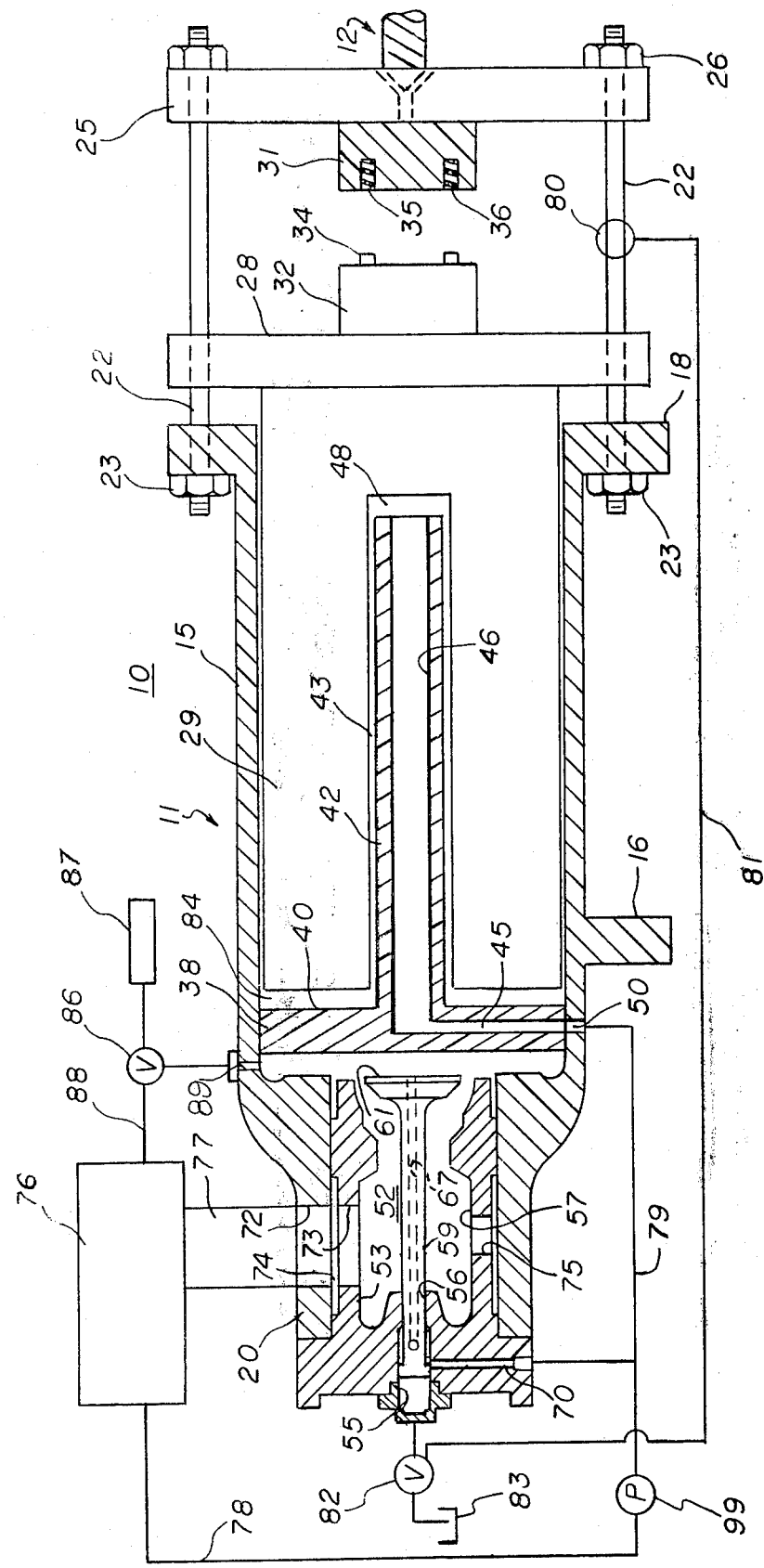
FIG. 1 is a cross-sectional view of a portion of an injection molding machine built in accordance with the principles of the present invention.

Referring to the drawings, and more specifically to FIG. 1, there is generally shown a portion of an injection molding machine 10. The injection molding machine 10 includes the clamp end 11 and the injection end 12, only a portion of which is shown and is well known in the art. On the clamp end 11 of the injection molding machine 10, there is a generally cylindrical shaped clamp cylinder 15. Projecting from the clamp cylinder 15 is a support flange 16. On the injection side of the clamp cylinder 15 is a flange portion 18. The end of the clamp cylinder 15 furthest from the injection end is a generally smaller diameter annular portion 20. A plurality of tie rod members 22 are secured to the clamp cylinder 15 at flange portion 18 by tie rod bolts 23. The other end of the tie rods are secured to the stationary platen 25 by bolts 26. A movable platen 28 is slidably guided along the tie rods 22. A cylindrically shaped main ram 29 is concentrically disposed within the clamp cylinder 15. The injection end of the main ram 29 is firmly secured to the movable platen 28 to move the same along the tie rods 22.

A mold half 31 is shown secured to the stationary platen 25. Another mold half 32 is secured to the movable platen 28. The mold halves form a mold of the spring loaded type diagrammatically represented by the protuberances 34 on mold half 32 and the receiving cavities 35 with spring members 36 therein.

A jack ram member 38 is disposed within the clamp cylinder 15. The jack ram 38 has a base portion 40 which is generally oval in shape. In FIG. 1, it can be seen that the base portion 40 extends from one side of the clamp cylinder 15 to the other, and in FIG. 3 it can be seen that there is an open chamber from the smaller diameter portion 20 of the clamp cylinder to the main ram 29. The jack ram 38 has an axially extending portion 42 projecting at right angles from the base portion 40 towards the injection end of the machine. The axially extending portion is concentrically disposed within a hollow cylindrical center portion 43 of the main ram 29. An annular passageway 45 is disposed through the base portion 40 of the jack ram 38 and is fluidly connected to an annular passageway 46 in the axially extending portion 42. Passageway 46 opens into an area 48 defined as the jack ram area which is partially defined by the axially extending portion 42 of the jack ram 38 and the walls of the center portion 43. An orifice 50 is disposed within the wall of the clamp cylinder 15 and is in fluid communication with the passageway 45 in the base portion 40 of the jack ram 38.

Adjacent the main ram 29 and jack ram 38 is a prefill valve 52. The prefill valve 52 is concentrically diposed within the smaller diameter portion 20 of the clamp cylinder 15. The prefill valve 52 includes an annular valve body 53 which is secured to the end of the smaller diameter portion 20 of the clamp cylinder 15 by any suitable means, not shown. Centrally disposed within the valve body 53 is a first guideway 55 and disposed toward the injection end is a smaller second guideway 56, which opens up into an annular cavity 57 concentrically disposed within the valve body 53.

Figure 2:
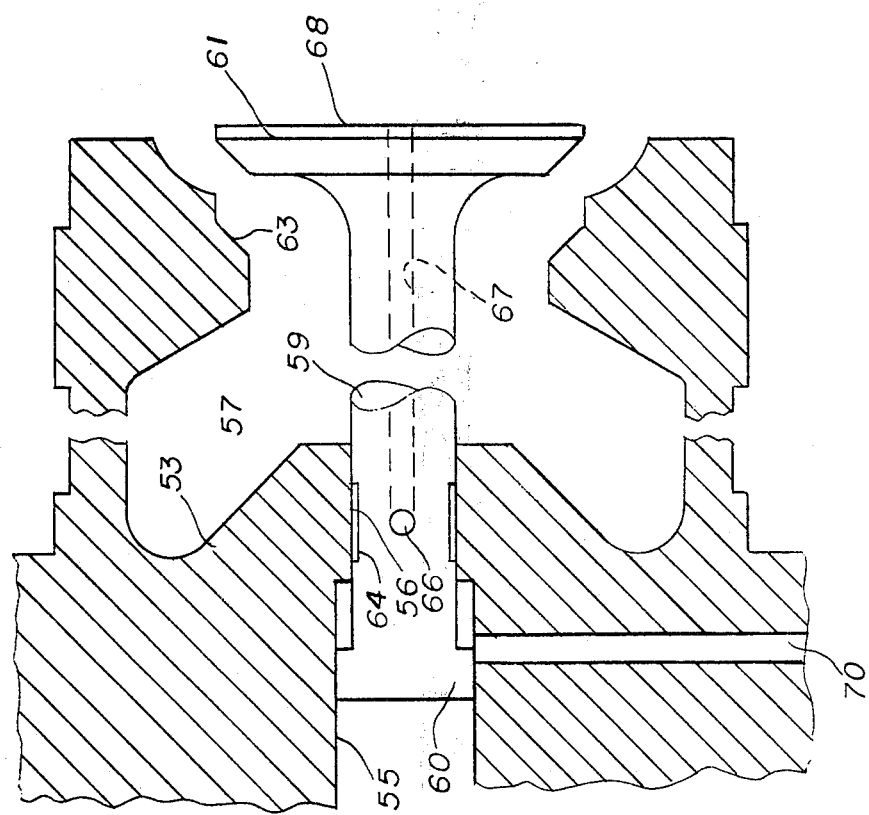
FIG. 2 is an enlarged view of a portion of the prefill valve shown in FIG. 1.

Best seen in FIG. 2, a valve stem 59 is slidably disposed within the first and second guideways 55 and 56.

At one end of the valve stem 59, there is a radially, outwardly flanged portion 60, which slides in the first guideway 55. At the other end of the stem 59 is a disk shaped closure member 61 which cooperates with a correspondingly shaped seating face 63 integrally formed with the valve body 53.

An intermediate portion 64 of the stem 59 is disposed between the flange portion 60 and the closure member 61. The portion 64 is of smaller diameter than the main body of the valve stem 59 and forms an annular channel therein. A plurality of apertures 66 are disposed around the periphery of the intermediate portion 64 and project inwardly to a centrally disposed fluid passageway 67. Passageway 67 projects from the apertures 66 to the forward face 68 of the closure member 61.

Figure 4:
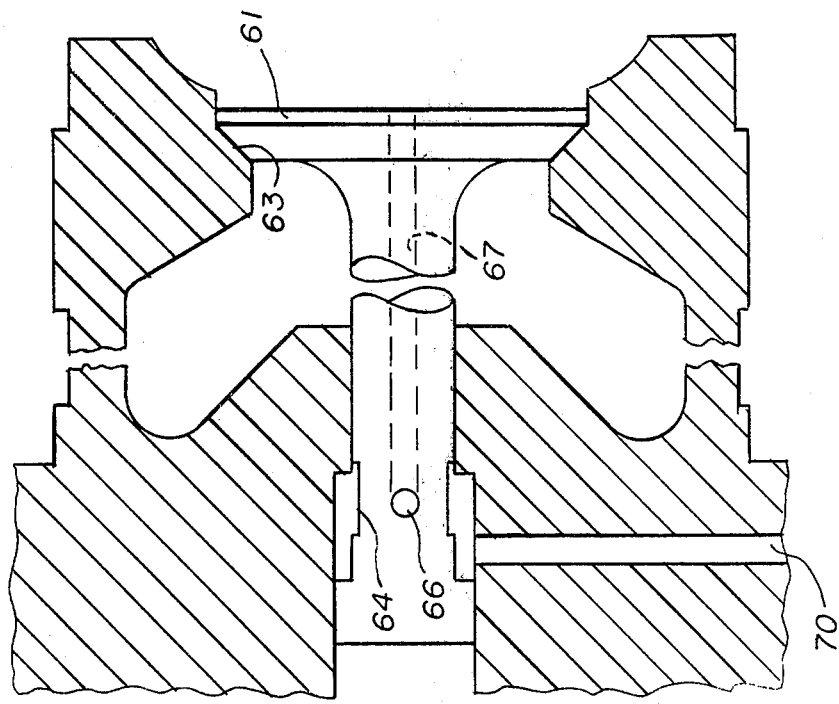
FIG. 4 is an enlarged view of the prefill valve shown in FIG. 3.
Figure 3:
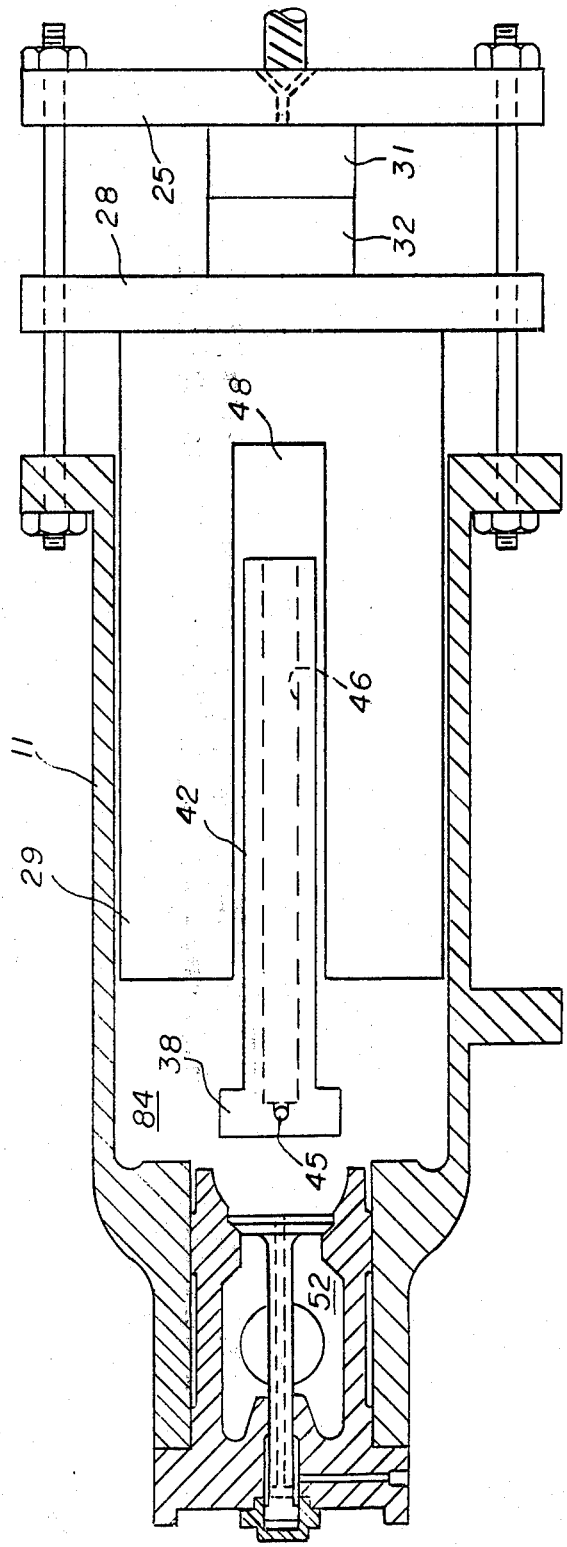
FIG. 3 is a view similar to FIG. 1 showing the injection molding machine in a closed position and rotated 90°.

A passageway 70 is defined within a flange portion furthest from the injection end of the valve body 53. As can best be seen in FIGS. 1 and 2, the passageway 70 is blocked by the flange portion 60 of the valve stem 59 when the closure member 61 is not seated on the seating face 63. Correspondingly, as shown in FIGS. 3 and 4, the passageway 70 is in fluid communication with the apertures 66 and passageway 67 when the closure member 61 is seated against the seating face 63.

The smaller diameter portion 20 of the clamp cylinder 15 has an inlet 72 which is fluidly connected to the cavity 57 of the prefill valve 52 by inlet 73. A small annular channel 74 is defined between the valve body 53 and the smaller diameter portion 20 of the clamp cylinder 15 and another inlet 75 is provided in the valve body 53 to allow fluid from the channel 74 to enter the cavity 57.

A hydraulic fluid tank 76 is positioned above the inlet 72 and is connected thereto by conduit 77. The fluid in tank 76 is connected by conduit 78 to high pressure pump 99 to the inlet of passageway 70 and orifice 50. The movable platen 28 trips the limit switch 80 which is connected through electrical line 81 to a four-way valve 82. Valve 82 is fluidly connected to the first guideway 55 and is also connected via the valve 82 to a drain pot 83.

The volume between the smaller diameter portion 20 of the clamp cylinder 15 and the main ram 29 is defined as the ram volume 84. An aperture 89 in the clamp cylinder 15 fluidly connects the ram volume 84 to a decompression valve 86. The valve 86 is actuated by timer 87 and is connected via conduit 88 to the tank 76.

In operation, as best seen in FIG. 1, hydraulic fluid from tank 76 is pressurized by pump 99 and is connected to passageway 70 and orifice 50. With the valve stem 59 in the open position, the pressurized fluid is blocked from communicating with the apertures 66. The pressurized fluid, however, does enter through orifice 50 into the passageway 45 in the base portion 40 of the jack ram and flows through passageway 46 into the jack ram volume 48. Pressurized fluid in volume 48 moves the main ram 29, as shown in FIG. 3, which in turn moves platen 28 and mold 32 attached thereto to the closed position. This closing action is commonly known in the art as the quick closing action of the injection molding machine.

Upon mold closure, hydraulic fluid from tank 76 flows through conduit 77, inlet 72, channel 74, inlet 73 and into the cavity 57 in the prefill valve 52. The fluid flows past the open closure member 61 and past the base portion 40 of the jack ram 38. The fluid prefills the main ram volume 84. The spring members 36 in mold half 31 tends to create an opening force of the mold halves and the platens. Therefore, a predetermined pressure must be maintained in the jack ram volume 48 at all times during the closing sequence to insure that the mold halves stay shut. If there is a pressure loss or decrease in volume in the jack ram volume 48, the molds may be opened up by the spring forces and the molding cycle can be completely interrupted. Because the pressure in the main ram volume 84 for a small period of time in the cycle is less than the pressure in the jack ram volume 48, oftentimes in conventional machinery, this is precisely what occurs. As the movable mold half 32 reaches the closed position, limit switch 80 is actuated, which in turn activates four-way valve 82. Hydraulic fluid between the flanged portion 60 of the valve stem 59 and the outer cap of the prefill valve 52 is drained through valve 82 into the drain pot 83. The flange 60 only partially blocks passageway 70 so the pressurized fluid in passageway 70 overcomes the pressure behind the flanged portion 60 to force the stem 59 backwards causing the closure member 61 to seat. There is high pressure fluid communication then between the fluid passageway 70, orifices 66, and passageways 67 to the ram volume 84. In this manner high pressure buildup occurs.

In the interim period, before high pressure buildup is achieved, there is a tendency for a pressure drop in the jack ram volume 48. The pressure drops through conduit 79 and passageways 67 and 70 are relatively small because of the length and cross-sectional area thereof. However, substantial pressure drops can be obtained and easily regulated by properly sizing the apertures 66. Therefore, in accordance with the principles of the present invention, apertures 66 are sized so that the pressure drop therethrough creates a pressure in the forward jack ram area 48 to create a force equal to or greater than the force exerted from the spring loaded mold. This insures that after closing and before high pressure buildup occurs, that the molds and platens are prevented from opening until the clamp achieves high pressure buildup.

The aperture area is calculable from the formula $Q = C \times A \times \sqrt{2GH}$ where $Q$ is the fluid flow, $C$ is the aperture coefficient, $A$ is the area of the aperture and $H$ is the pressure head. When $Q$ is in cubic feet per second, and $A$ is in square feet and $H$ is in feet, $Q$ in gallons per minute equals $24.12 \times A$ in square inches $\times$ the square root of the pressure drop in lbs. per square inch. When C equals 0.6 and the specific gravity equals 0.895, the area A of the aperture is easily calculable knowing the flow rate since the pressure drop creates a force in the jack ram area equal to or greater than the spring forces tending to open the mold. The total area is then divided by the number of apertures 66 to obtain the area per aperture from which the diameter is obtained. Therefore, the apertures 66 can be properly sized to maintain a sufficient pressure drop to insure that the mold will remain closed until high pressure buildup occurs. The larger the spring forces on the molds, the smaller the aperture size to maintain the required pressure drop in the flow system. After injection, timer 87 activates valve 86 to decompress the ram volume 84 to allow the ram to move to the open position.

While only one embodiment has been shown, it will be obvious to those skilled in the art that many modifications can be made without departing from the spirit and scope of the invention.

What is claimed is:

1. An injection molding machine having a pair of platens a mold half mounted on each of said platens spring means associated with at least one of said mold halves for exerting a force on the other of said mold halves in a closed position, a clamp cylinder, a movable main ram disposed within the cylinder to open and close one of the platens, a prefill valve disposed adjacent said main ram, said prefill valve having a valve body disposed within the cylinder, said valve including a valve stem slidably disposed within the body, a closure member secured to one end of the stem, a fluid passage means in said valve body in fluid communication with said main ram, high pressure fluid supply means fluidly connected to said passage means when said closure member is seated, the improvement comprising:

said passage means being of a size so that the pressure drop therethrough creates a force at least equal to or greater than the force exerted by said spring means when said mold halves are closed.

2. The structure recited in claim 1 and further including a jack ram structure, said structure concentrically disposed within the main ram, said structure being positioned adjacent said prefill valve and providing fluid communication between the prefill valve and the main ram.

3. The structure recited in claim 2 wherein said jack ram has a fluid passageway therethrough, said passageway being fluidly connected to said high pressure fluid supply means.

4. The structure recited in claim 3 wherein said high pressure fluid is supplied to said fluid passageway to close a platen and then said fluid is supplied to said passage means in said prefill valve.

5. The structure recited in claim 1 wherein said passage means includes a passageway in said valve body, at least one inwardly projecting aperture in said valve stem and an axially extending passageway in said stem projecting from said aperture through said closure member, said aperture being sized so that most of the pressure drop through said passage means occurs through said aperture.

6. The structure recited in claim 5 wherein said valve body defines a centrally disposed first guideway, said valve stem having a flanged portion on the end opposite the closure member, and said flanged portion being slidably disposed in said first guideway.

7. The structure recited in claim 6 and including an intermediate portion of the stem on which is an annular groove disposed on the periphery of the stem, the aperture being disposed on said intermediate portion of the stem.

* * * * *